United States Patent

Bialek

[15] 3,694,931
[45] Oct. 3, 1972

[54] TRAINING DEVICE FOR TEACHING DIGITAL LOGIC OPERATIONS

[72] Inventor: Joseph J. Bialek, 1 Hillside Dr., New York Mills, N.Y. 13417

[22] Filed: Jan. 6, 1970

[21] Appl. No.: 994

[52] U.S. Cl. ................................................35/19 A
[51] Int. Cl. ..............................................G09b 23/18
[58] Field of Search ..................35/19 A, 13, 30, 7 A

[56] References Cited

UNITED STATES PATENTS

| | | | |
|---|---|---|---|
| 3,546,793 | 12/1970 | Roelofs et al. | 35/19 A |
| 3,510,963 | 5/1970 | Zbar et al. | 35/19 A |
| 3,175,304 | 3/1965 | Och et al. | 35/19 A |
| 3,277,589 | 10/1966 | Berdan et al. | 35/19 A |
| 3,309,793 | 3/1967 | Bartee | 35/10 |
| 2,592,552 | 4/1952 | De Florez et al. | 35/19 A |
| 3,410,001 | 11/1968 | Blum | 35/19 A |

FOREIGN PATENTS OR APPLICATIONS

| | | | |
|---|---|---|---|
| 789,775 | 7/1968 | Canada | 35/19 A |

*Primary Examiner*—Wm. H. Grieb
*Attorney*—Sughrue, Rothwell, Mion, Zinn & Macpeak

[57] ABSTRACT

A training device for instructing students in digital logic, which includes a desk size panel upon which digital logic operations may be fabricated and visually displayed, a plurality of digital logic circuit devices having means for both mechanical and electrical attachment to the panel, circuit connection means for connecting the digital logic circuit devices to a source of bias voltage supply for energizing the digital logic devices, circuit connection means for providing selected interconnections between the digital logic devices displayed on the panel, and means for providing input digital values to the interconnected digital logic devices. Both magnetic and plug-type embodiments are disclosed as means for mechanically and electrically attaching the digital logic devices to the panel.

1 Claim, 9 Drawing Figures

INVENTOR
JOSEPH J. BIALEK

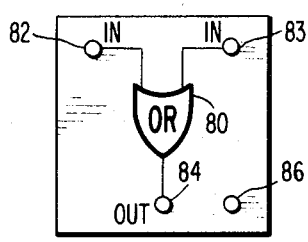
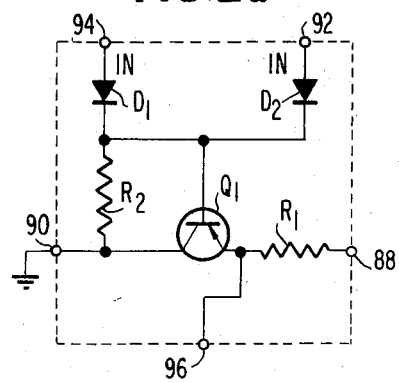
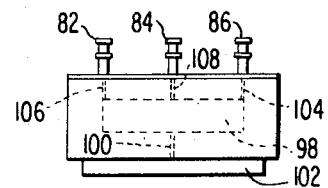
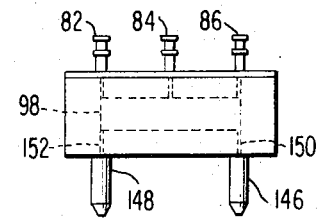
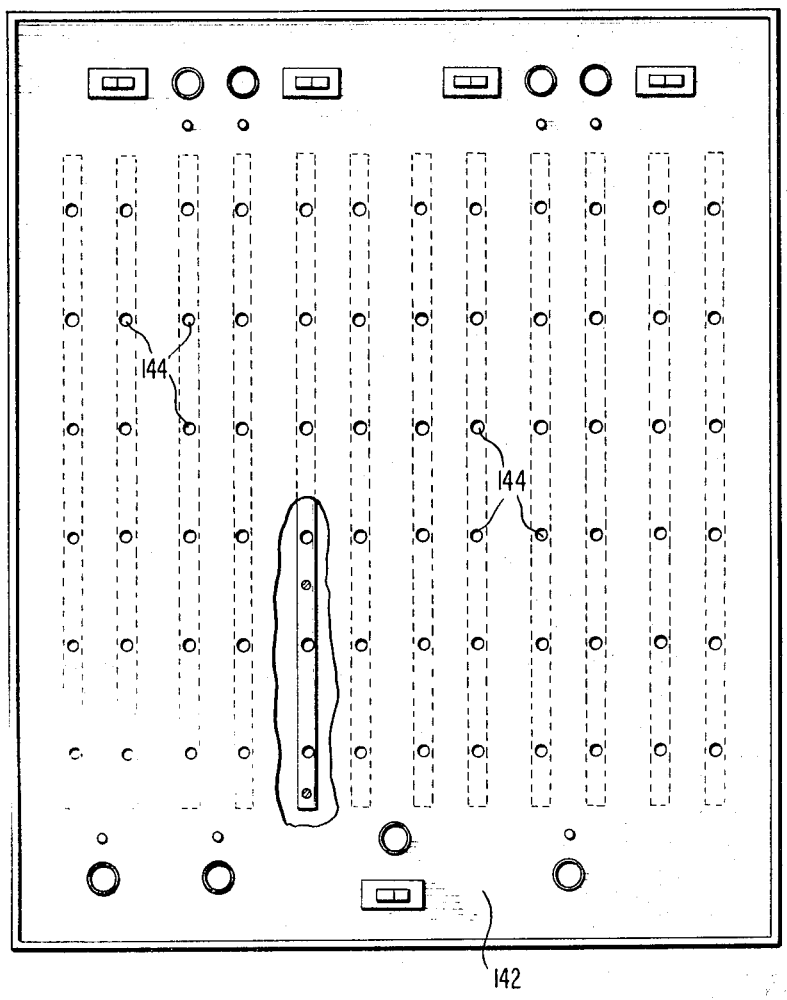
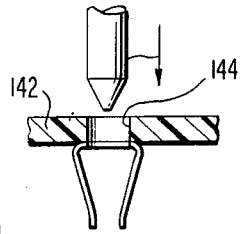

TRAINING DEVICE FOR TEACHING DIGITAL LOGIC OPERATIONS

BACKGROUND OF THE INVENTION

1. Field of the Invention

This invention relates to training devices and more particularly to a training device for teaching digital logic operations.

2. Description of the Prior Art

Various training devices for instructing students in digital logic are disclosed in the prior art. Some of the training devices are small desk type trainers which are made available to each individual student. Others are large panels which may be displayed before an entire group of students. Regardless of the size of the panel, however, each trainer may be classified into one of two types. The first type comprises a panel containing a fixed number of logic circuits in a fixed position. These circuits may then be interconnected by some electrical connection means to perform a desired digital operation. One disadvantage with this type of panel is that the resulting circuit of interwoven patch cord rarely resembles the circuit as it would appear on a schematic diagram. This discrepancy may seriously hinder a student's understanding of the logic operation because of the resulting confusion. A second type of training device employs a panel and a number of digital logic devices which may be selectively placed upon the panel and then electrically interconnected with each other as well as connected to a bias voltage supply for energizing the digital logic devices. Thus, only the digital logic devices employed in a particular logic operation are displayed before the student at any one time. In employing this type of training device, however, there is a problem in mechanically attaching the logic devices to the panel and electrically connecting these devices to the bias supply and to each other to perform the desired logic operation. Various techniques of attaching the logic devices to the panel have been employed including mechanical hooks, plug-in arrangements, and magnetic attaching. However, a disadvantage of these techniques as employed in the prior art is that the logic devices must be placed at a predetermined, specific location upon the panel and thus the representation may not be identical to that of a schematic diagram of the logic operation. In addition, there have been various techniques employed to interconnect the logic circuits to one another, including patch cords and alligator clips. Even though only those logic circuits employed in generating a particular logic operation are displayed upon the front surface of the panel at any one time these means of interconnecting the logic circuits may result in an interwoven patch of connections and make it difficult for a student to realize the actual connections made.

SUMMARY OF THE INVENTION

Accordingly, it is an object of this invention to provide a digital logic training device which obviates these difficulties.

More specifically, it is an object of this invention to provide a digital logic training device wherein the individual logic circuits may be placed at any position upon the front surface on the panel.

Another object of this invention is to provide an unique interconnection means so as to facilitate a visual understanding of the actual connections made.

The digital logic training device provided by the subject invention is of the desk type. It employs a panel upon which individual logic devices may be mechanically secured and electrically connected to voltage supply sources for energizing the digital devices and for providing digit input voltages to them. Each digital logic device comprises a conventional logic function, for example, AND and OR functions, and hereinafter are referred to as logic modules because each comprises an individual unit. To perform their assigned logic function, a bias voltage must be supplied to their component elements comprising various combinations of resistors, transistors, capacitors and inductors, in order to energize these component elements. Therefore, both positive and ground terminals are provided on each logic module to accept this bias supply voltage; these terminals are hereinafter referred to as the bias terminal of a logic module. The logic modules must also be interconnected to each other in such a fashion as to generate a desired logic operation, that is, the outputs from some logic modules are inputs to other logic modules whose outputs in turn are inputs to other logic modules and so on until the desired logic operation is generated at the output of the final logic module. Therefore, input and output terminals are also provided on each logic module. In operation, the desired logic modules are mechanically attached to a panel, electrically connected to a bias supply source, electrically connected to each other to generate a desired logic operation, and finally electrically connected to digital input voltage levels which are then operated upon by each logic module so that the desired logic operation is generated at the output of the interconnected logic modules.

In achieving the above objectives, two embodiments of the subject invention are provided. In one embodiment, a magnetic coupling provides both electrical and mechanical connection between the logic modules and the front surface of the panel and is hereinafter referred to as the magnetic embodiment. In a second embodiment, apertures are provided in the front surface of the panel and plugs are provided in the back surface of the logic modules so that the logic modules may be plugged into the apertures to achieve both electrical and mechanical coupling and is hereinafter referred to as the plug-type embodiment.

In the magnetic embodiment, the front surface of the panel is a ferrous type material having magnetic properties and is electrically connected to one terminal of the bias supply source for energizing the circuits comprising each logic module. The back surface of each logic module comprises a permanent magnet which is electrically connected to one bias terminal of the logic module. Therefore, whenever a logic module is placed upon the panel's front surface, the magnetic attraction between the magnet and the ferrous material of the panel surface will maintain the logic module in contact with the panel surface, thereby providing both mechanical and electrical contact between the logic module and the panel surface. A second terminal of the bias voltage supply is exposed in the front surface of the panel by means of a bus bar. A connection between the second bias terminal of a logic module and the bias supply source is then made by interconnecting the terminal provided on the logic module with a terminal of the bus bar with a patch cord, an alligator clip, or as preferred in this invention, a spring conductor so that it is readily apparent to a student where the connections are made.

In the plug-type embodiment of the invention, the panel is constructed of a non-conducting material. Apertures, however, are provided and arranged in columns and rows. Placed immediately behind each column of apertures is a channel member comprising an electrical contact strip, and flexible metallic side members which spread when a pointed plug member is inserted between them thereby offering mechanical support to the pointed plug member. These channel members are alternatively connected to the terminals of the bias voltage supply. Therefore, the channel members are arranged in pairs so that one comprises a positive terminal and the other a ground terminal of the bias voltage supply. The logic modules are provided with a pair of plugs on their back surfaces which are spaced so they may be inserted into the apertures of two adjacent columns. These plugs are in turn electrically connected to the terminals of the bias circuit comprising the logic module so that when the logic module is plugged into the apertures the channel member provides both mechanical support and electrical connection to the bias voltage supply, thereby energizing the logic circuits comprising each logic module. Therefore, in this embodiment both electrical connections to the bias voltage supply are made by mechanically affixing the logic modules to the panel and there is no need for a bus bar as in the magnetic embodiment.

Once the logic modules are affixed to the panel face the operation of each embodiment is identical. Vertical terminal posts which are electrically connected to the input and output terminals of the logic circuits comprising the logic module are provided on the front surface of each logic module. Once placed upon the panel's surface, the logic modules are electrically interconnected as desired by providing an electrical conductor between selected vertical terminal posts. The conductor may be a patch cord, with alligator clips or as preferred in the invention a spring conductor stretched between the vertical terminal posts. Similarly, there are vertical terminal posts provided for the digital input voltage signals and the output voltage signals. The input voltage signals are selected by means of a witch to provide either a digital value of a zero or one. Input and output indicator lights visually display the input and output voltage signals for facilitating a student's use of the device. These lights may be, for example, "on" if a digital value of one is represented or "off" if a digital value of zero is represented. In addition, a master switch is provided to facilitate control on the panel operations.

BRIEF DESCRIPTION OF THE DRAWINGS

FIG. 2a, 2b, 2c, and 2d illustrate a sample logic module for both the magnetic and the plug-type embodiment;

FIG. 3 illustrates a plug-type embodiment of the invention;

FIG. 4a and 4b illustrate a channel member employed in the plug-type embodiment of the subject invention;

DESCRIPTION OF THE PREFERRED EMBODIMENTS

Figure 1:
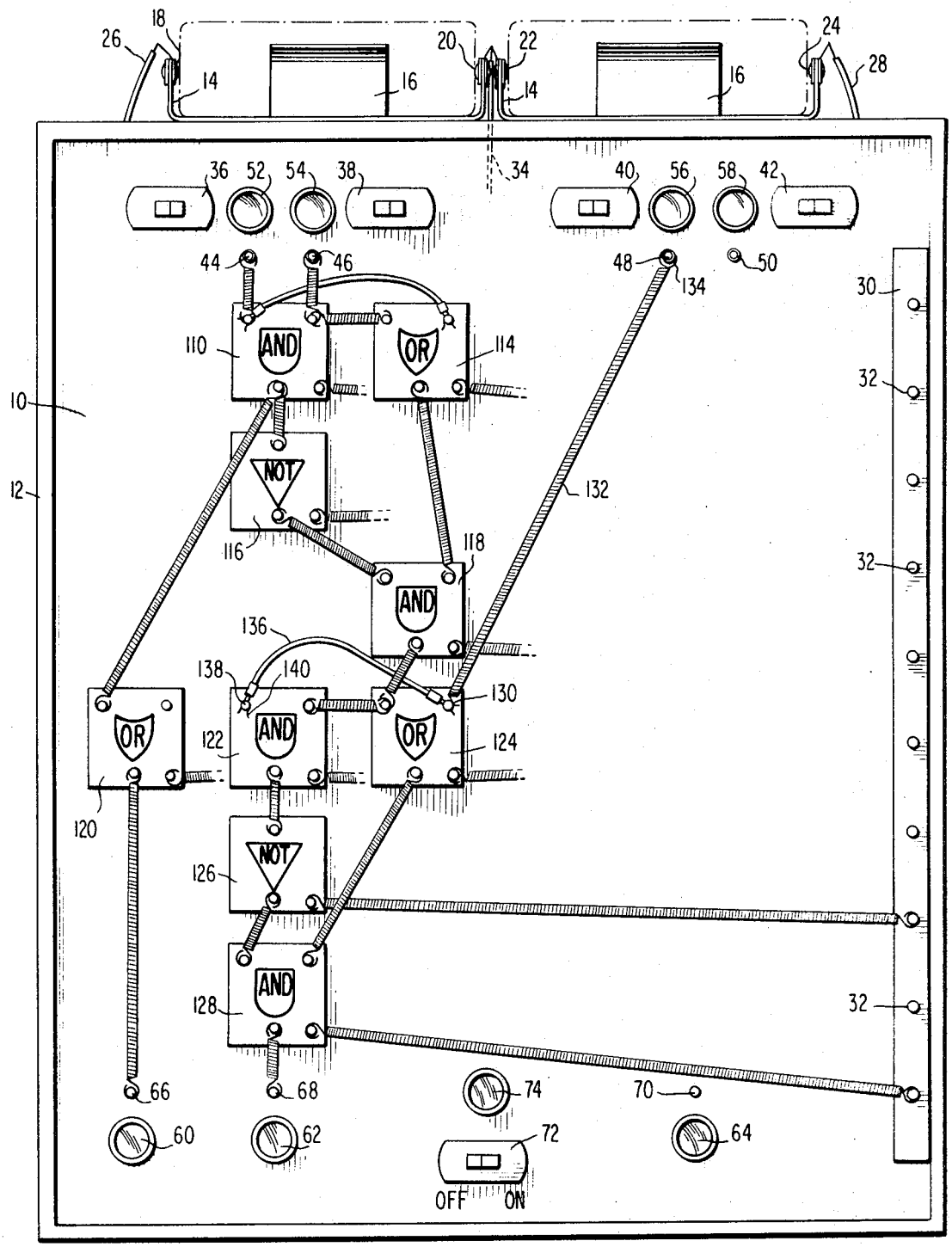
FIG. 1 illustrates a magnetic embodiment of the invention.
Figure 5:
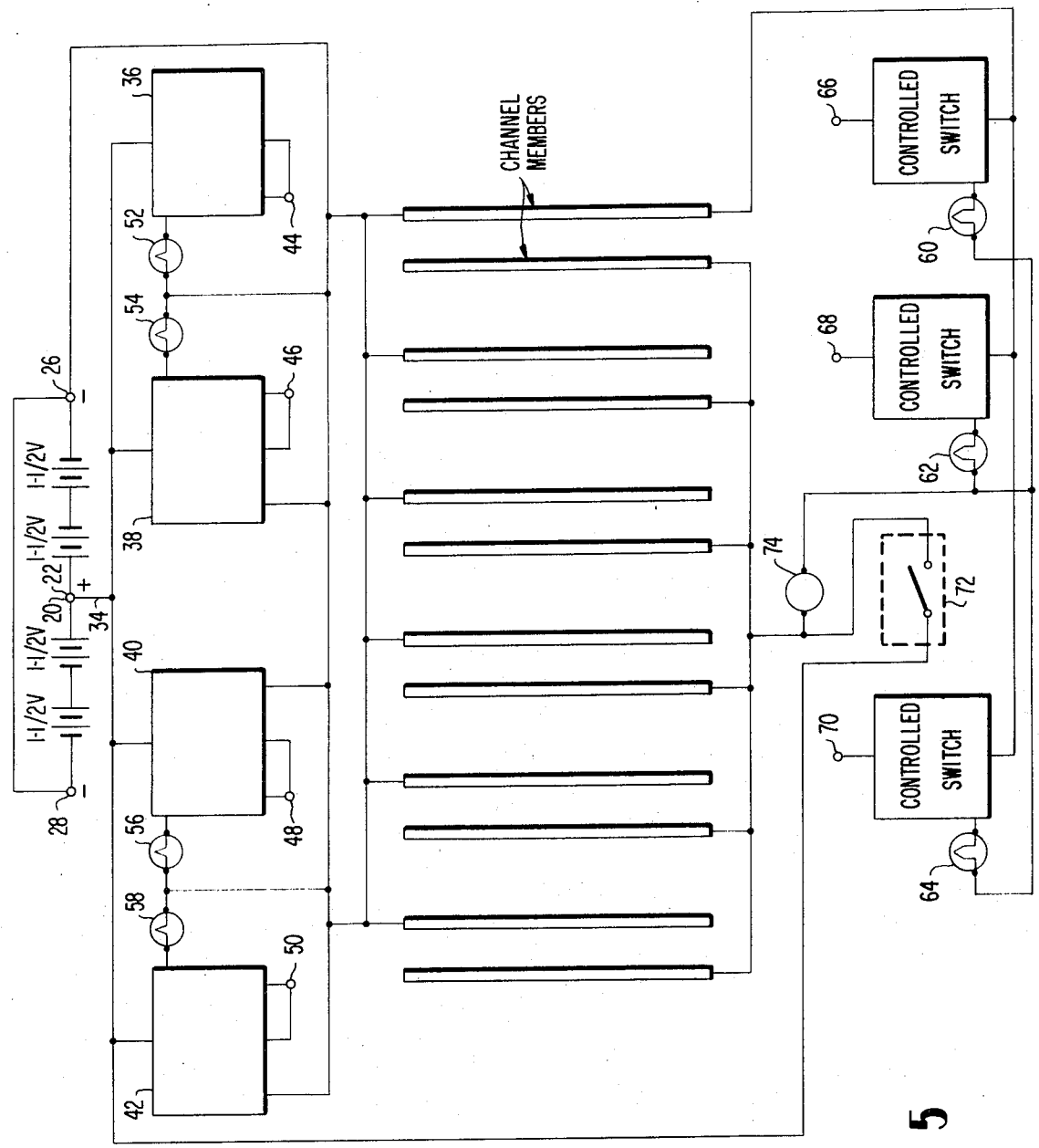
FIG. 5 is an electrical circuit diagram of the electrical counterparts of the mechanical structure shown in FIG. 3.

FIG. 1 illustrates a magnetic embodiment of the invention. The front surface of the panel 10 is constructed from a ferrous material having magnetic properties. The panel 10 is supported by frame member 12 which may be constructed from wood, metal or any other common construction material. At the top of the frame 12, the brackets 14 and the support members 16 are provided to accept conventional dry cell batteries which provide a bias voltage supply for the logic modules. When the batteries are inserted between the brackets 14 the contacts 18–24 achieve electrical contact with the terminals of the batteries and a potential difference is established between the terminals 18–20 and 22–24 because of the batteries are connected in parallel. Preferably this potential difference is 3 volts above ground as a reference; no negative voltages are required. This potential difference comprises the bias voltage supply used to energize the logic circuits comprising the logic modules and is transmitted to the panel via conductor 34 which is electrically connected to the front surface of the panel by any conventional means, for instance soldering. The other conductors, 28 and 26, are electrically connected to a bus bar 30 to provide ground connection on the front surface. Bus bar 30 comprises a plurality of vertical terminal posts 32 to facilitate interconnection with the logic modules.

In addition to a bias voltage supply, a voltage source is needed to provide digital input signals, either digital zero or a one to selected logic modules. As illustrated, this voltage source comprises the potential difference between the contacts 18 and 20 and 22 and 24 when batteries are inserted in the brackets 14. Thus, this source is identical to the bias voltage supply. However, a separate battery supply may be employed instead. This potential difference is derived by electrical conductors 26, 28 and 34 which are connected to the switches 36–42 which facilitate the control of this voltage. As illustrated, these switches may be manipulated to either the left or right to provide a voltage corresponding to either a digital zero or one at the input terminal posts 44–50. Lights 52–58 are provided to visually indicate which digital signal is available at the posts 44–50, respectively. Therefore, if switch 36 is manipulated to the left so that a digital value zero appears at input post 44, its associated visual indicator 52 will be, for example, "off." If switch 36 is manipulated to the right a voltage representing a digital value of one will appear at terminal post 44 and the visual indicating light 52 will be "on." Similarly, indicator lights 60-64 are provided at the bottom of the panel to indicate the digital value at the output terminal posts 66–70. In addition, a master control switch 72 and its associated visual indicator light 74 is provided at the bottom of the panel. The switch 72 allows the operator to control the application of voltages to both the panel surface and the bus bar.

FIG. 2 illustrates an individual logic module. As illustrated, it comprises an OR gate; however, it is easily seen that the techniques employed are equally adaptable to any logic function by constructing the logic module in accordance with the subject invention. FIG. 2a illustrates the front surface of a logic module. The logic function performed by the logic module is graphically illustrated as shown by the OR representation 80. In addition, vertical terminal posts 82–86 are also provided on the front surface of the logic module to facilitate interconnection with other logic modules and in the case of the magnetic embodiment, the bus bar 30. These vertical terminal posts are electrically connected to the input and output terminals of the logic circuitry comprising the logic module and in the case of the magnetic embodiment vertical terminal post 86 is connected to one terminal of the bias circuitry comprising the circuitry in the logic module.

For instance, the circuitry comprising an OR gate may be designed as shown in FIG. 2b. In order for this circuit to perform a logic function, the bias voltage supply must be provided between the terminals 88–90. These terminals are hereinafter referred to as the terminals of the bias circuitry of the logic module. Once biased, the circuitry may perform the digital OR function with input signals received on terminals 92 and 94. The OR function of these input signals appears on the output terminal 96. It is these terminals which are provided at the front surface of the logic module as illustrated in FIG. 2a by the vertical terminal posts and are hereinafter referred to as the input and output terminals. In the magnetic embodiment, the terminal post 86 is electrically connected to the terminal 90.

FIG. 2c illustrates how these terminal connections are made in the magnetic embodiment. The block circuit element 98 represents the circuit means as illustrated in FIG. 2b. The terminal 88 of the circuit means is electrically connected by a conductor 100 to a permanent magnet 102 which is affixed to the back surface of the logic module. The terminal 90 of the circuit means is electrically connected to the vertical terminal post 86 by a conductor 104. Similarly, the terminal 94 is connected to the vertical terminal post 84 by a conductor 106 and the terminal 96 is connected to the vertical terminal post 84 by a conductor 108.

Now it can be seen how the logic modules are connected to the bias voltage supply and interconnected with each other to perform a desired logic operation. A logic gate 110 as illustrated in FIG. 1 is placed upon the front face of the panel. The back surface of the logic module 110 comprises a permanent magnet 102 as illustrated in FIG. 2c. Thus, since the front surface of the panel 10 comprises a ferrous material having magnetic properties, a magnetic attachment is made between the logic module 110 and the panel surface 10. However, an electrical contact is also made with the panel surface since the magnet 102 is electrically coupled by conductor 100 to the circuit means 98 comprising the logic module. The panel front surface 10 is in turn electrically coupled to one terminal of the bias voltage supply via the conductor 34. A second connection to the bias voltage supply source is made by stretching an electrical conductor between the vertical terminal post 86 and a vertical terminal post 32 on the bus bar 30 since bus bar 30 is in turn connected to one terminal of the bias voltage supply via conductors 28 and 26. In a similar fashion the remaining logic modules 114–128 are both electrically and mechanically affixed to the panel surface 10. Once affixed to the panel surface 10, these logic modules may be interconnected with each other to perform a desired logic function. This interconnection is achieved by placing a conductor between the selected vertical terminal posts of the logic modules. These terminals posts as described above are electrically connected to the input and output terminals of the logic means 98 comprising the logic modules. A logic operation is then performed by similarly connecting the input terminals of selected logic modules to the desired input digital values present at vertical input terminal posts 44–50.

The preferred method of making these interconnections is by stretching a conductor which has been fabricated as a spring between the selected terminal posts. For example, electrical connection is made between the vertical input terminal post 48 and the terminal post 130 is logic module 124 by stretching a spring conductor 132 between these terminal posts. A hook 134 is provided at each end of the spring connector so that it may be mechanically affixed to the terminal posts. This is the preferred method of interconnecting these terminal posts since it provides further mechanical stability to the arrangement of logic modules as well as making it apparent to a student as to which connections are actually made. However, this is not the only means of interconnecting these terminal posts as is illustrated by a conventional conductor 136 connecting terminal post 130 and 138. In employing this conventional type of conductor, mechanical connection is made with a prong type clip 140 which spreads and thus attaches to a terminal post.

FIG. 3 illustrates a plug-type embodiment of the subject invention. In this embodiment, the panel surface 142 need not be of a ferrous material and, in fact, may be of a non-conducting material. The only distinction between this embodiment and the magnetic embodiment is that means for attaching the logic modules to the panel front surface 142; the operation and means for supplying the required voltages is identical. In this embodiment a plurality of apertures 144 arranged in columns and rows are provided in the panel.

Placed immediately behind each column of these apertures is a channel member as illustrated in FIGS. 4a and 4b. FIG. 4a illustrates the full length of a channel member as it would appear if the panel front face were cut away in front of one column. FIG. 4b illustrates a cross-section of the channel member. From FIG. 4b it can be seen that when a tapered plug of the proper diameter is inserted into the channel member, the channel member will slightly spread to accommodate the plug and provide mechanical force on the sides of the plug and thus achieve mechanical attachment between the plug and the channel member.

Thus, if the logic modules are provided with plug-type members in their back surface, the channel members placed immediately behind each column of apertures would affix the logic modules to the panel front surface whenever the plug members were inserted into the channel member. An embodiment of the logic modules comprising plug members 146, 148 is illustrated in FIG. 2d. As can be seen, this embodiment of the logic modules is very similar to that for the magnetic embodiment as illustrated in FIG. 2c. The only difference is that the plugs 146, 148 replace the need for a permanent magnet and the terminal post 86 since both bias voltage supply connections may be made via these plug members 146 and 148. The plug members 146 and 148 are electrically connected to the terminals 88 and 90 of the logic means 98 comprising the logic module via the electrical conductors 150 and 152. The input and output terminal posts 82–84, however, are still upon the front surface of the logic module as illustrated in FIG. 2d.

Therefore, whenever a logic module having two plug-type members 146–148 as illustrated in FIG. 2d is inserted into the apertures 144 in the panel face 142, both electrical and mechanical contact will be made with metallic channel members placed immediately behind each column of apertures. Plug member 146 will be inserted into one column of apertures and plug member 148 is inserted into the adjacent column. The channel members are connected alternatively to the terminals of the bias supply source via the conductors 26, 28 and 34. This is, the column associated with plug member 146 is connected to, for example, the positive terminal of the bias voltage supply and the column associated with the plug member 148 is connected with the ground terminal of the bias voltage supply. Therefore, once plugged into the channel members the logic modules are mechanically affixed to the panel front surface 142 and electrically connected to the bias voltage supply. The channel members are spaced so as not to invert the bias polarity.

Once the desired logic modules have been affixed to the panel front surface 142 they are interconnected with each other and with the input digital voltage values as described above in the magnetic embodiment. Similarly, visual indicators 52–58 may be provided to indicate the digital value of the input voltages available. Output indicators 60–64 may also be provided.

What is claimed is:

1. A training device of the type displaying the operation of digital logic circuits comprising;
   a panel display means including a panel board, input indicator lights at the top of said panel board and output indicator lights at the bottom of said panel board;
   input and output vertical terminal posts positioned on said panel board adjacent, respectively, said input and output indicator lights;
   a plurality of digital logic modules capable of being removably attached to said panel board having vertical terminal posts placed on said front surface of each of said logic modules and electrically connected to said logic modules for facilitating interconnection with other of said logic modules and said input and output terminal posts on said panel board, each logic module having indicia on said front surface to indicate its electrical function;
   a source of bias voltage for energizing said logic modules;
   switch means provided on said panel board and connected to said source of bias voltage whereby a voltage signal may be transmitted to said input terminal posts and also activate said input indicator lights, said output indicator lights adapted to provide a visual readout of the digital value at said output terminal posts;
   a plurality of helical wire spring conductors capable of varying lengths attaching to said vertical terminal posts to selectively, mechanically and electrically interconnect said logic modules and said vertical posts on said panel board, each spring conductor formed of a single helical wire terminating in a hook at each end;
   circuit means to selectively interconnect said logic modules;
   an input voltage supply means for providing digital input signals to said interconnected logic modules, wherein said logic modules are affixed to said panel board and operatively interconnected to perform a desired logic operation;
   a plurality of apertures arranged in at least two columns and rows disposed on said panel board;
   an inverted U-shaped channel member placed immediately behind and extending the length of each column of said apertures and having a base positioned on the back of said panel board and a pair of resilient sides extending out from the base and towards each other, said base having holes in alignment with said apertures in said panel board;
   electrical connection means for connecting said channel members to the positive and ground terminals of said bias voltage source, whereby channel members will be sequentially positive and ground biased, and
   at least a pair of solid constant diameter cylindrical plug members protruding from the back surface of each of said logic modules, whereby said logic modules may be inserted respectively through said apertures and said base holes of at least two adjacent channel members to mechanically spread and to electrically contact said sides and thereby provide both a mechanical support for said logic modules and electrical connection between said logic modules and said bias voltage source.

* * * * *